(12) United States Patent
Ananth et al.

(10) Patent No.: US 7,466,778 B2
(45) Date of Patent: Dec. 16, 2008

(54) MEMORY EFFICIENT OFDM CHANNEL ESTIMATION AND FREQUENCY DOMAIN DIVERSITY PROCESSING

(75) Inventors: Sharath Ananth, Oceanside, CA (US); Sanjai Kohli, Manhattan Beach, CA (US); Mark Alan Sturza, Encino, CA (US); Donald Leimer, Rancho Palos Verdes, CA (US)

(73) Assignee: SiRF Technology, Inc., San Jose, CA (US)

( * ) Notice: Subject to any disclaimer, the term of this patent is extended or adjusted under 35 U.S.C. 154(b) by 27 days.

(21) Appl. No.: 11/614,590

(22) Filed: Dec. 21, 2006

(65) Prior Publication Data

US 2007/0206687 A1 Sep. 6, 2007

Related U.S. Application Data

(60) Provisional application No. 60/771,421, filed on Feb. 7, 2006, provisional application No. 60/753,474, filed on Dec. 22, 2005.

(51) Int. Cl.
*H04L 1/02* (2006.01)
*H04B 7/08* (2006.01)

(52) U.S. Cl. ...................................... 375/347; 455/132

(58) Field of Classification Search ................ 375/267, 375/347, 316, 260; 455/132, 137
See application file for complete search history.

(56) References Cited

U.S. PATENT DOCUMENTS

| | | | |
|---|---|---|---|
| 4,636,972 A * | 1/1987 | Boland | ........................ 708/321 |
| 6,411,892 B1 | 6/2002 | Van Diggelen | |
| 6,417,801 B1 | 7/2002 | Van Diggelen | |
| 6,429,814 B1 | 8/2002 | Van Diggelen et al. | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Van Diggelen | |
| 6,542,820 B2 | 4/2003 | LaMance et al. | |
| 6,560,534 B2 | 5/2003 | Abraham et al. | |
| 6,606,346 B2 | 8/2003 | Abraham et al. | |
| 6,704,651 B2 | 3/2004 | Van Diggelen | |
| 6,785,520 B2 * | 8/2004 | Sugar et al. | .................. 455/101 |
| 2003/0123383 A1 * | 7/2003 | Korobkov et al. | ............ 370/208 |
| 2006/0013327 A1 * | 1/2006 | Sugar et al. | .................. 375/260 |

* cited by examiner

*Primary Examiner*—Tesfaldet Bocure
(74) *Attorney, Agent, or Firm*—Thomas, Kayden, Horstemeyer & Risley, LLP

(57) ABSTRACT

A frequency domain diversity DVB receiver device includes multiple antenna ports for receiving radio signals, and radio signal processing circuits connected to the antenna ports that convert the received radio signals into digital samples. The digital samples from the different antenna ports time-share a front-end processor which processes the digital samples to provide time-domain symbols. The time-domain symbols are stored in time-domain symbol buffers according to which of the antenna ports the time-domain symbols are received. A fast fourier transform circuit then retrieves the time-domain symbols and converts them frequency-domain symbols, which are then stored one or more frequency-domain symbol buffers according to the antenna ports the corresponding radio signals are received. A diversity processor which combines the frequency-domain symbols from the frequency-domain symbol buffers.

20 Claims, 7 Drawing Sheets

MEMORY EFFICIENT OFDM CHANNEL ESTIMATION AND FREQUENCY DOMAIN DIVERSITY PROCESSING

CROSS REFERENCE TO RELATED APPLICATIONS

The present invention is related to and claims priority of (a) U.S. Provisional Patent Application, entitled "Efficient OFDM Frequency Domain Diversity Processing," Ser. No. 60/771,421, which was filed on Feb. 7, 2006; and (b) U.S. Provisional Patent Application, entitled "Memory Efficient OFDM Channel Estimation," Ser. No. 60/753,474, which was filed on 22 Dec. 2005. The disclosures of these U.S. provisional patent applications are hereby incorporated by reference in their entireties.

BACKGROUND OF THE INVENTION

1. Field of the Invention

The present invention relates to methods and systems for reducing the memory required in digital video broadcasting (DVB-T/H) receivers.

2. Discussion of the Related Art

The DVB-T and DVB-H signal formats are defined in ETSI EN 300 744, "Digital Video Broadcasting (DVB); Framing structure, channel coding and modulation for digital terrestrial television". DVB-H is further defined in ETSI TR 102 377, "Digital Video Broadcasting (DVB); DVB-H Implementation Guidelines".

Conventional DVB-T/H diversity receivers are exemplified in the discussion by Yannick Lévy, "DVB-T—A fresh look at single and diversity receivers for mobile and portable reception", EBU TECHNICAL REVIEW, April 2004, incorporated herein by reference. Additional information regarding DVB-T systems can be found in the following works:

a Mark Massel, "Digital television, DVB-T COFDM and ATSC 8-VSB", Digitaltvbooks.Com, 2000.
b Seamus O'Leary, "Understanding Digital Terrestrial Broadcasting", Artech House, 2000.
c Ulrich Reimers, "Digital Video Broadcasting: The International Standard for Digital Television", Springer, 2001.
d Herve Benoit, "Digital Television: MPEG-1, MPEG-2 and Principles of the DVB System", Focal Press, 2002.
e Ulrich Reimers. "DVB: The Family of International Standards for Digital Video Broadcasting", Springer, 2004.
f Walter Fischer, "Digital Television: A Practical Guide for Engineers", Springer, 2004.

Briefly, the DVB-T/H system is specified for 8 MHz, 7 MHz, 6 MHz, and 5 MHz channel spacings. The 2K mode and 8K mode are defined for DVB-T and DVB-H transmissions. The 4K mode is defined exclusively for DVB-H transmissions.

The DVB-T/H signal structure is organized into frames. Each frame consists of 68 OFDM symbols. Each symbol consists of a set of carriers: 6817 in 8K mode, 3409 in 4K mode, and 1705 in 2K mode. Each carrier is independently modulated over the duration of each symbol's transmission. All data carriers in one OFDM symbol are modulated using one of the following techniques: QPSK, 16-QAM, non-uniform 16-QAM, 64-QAM, or non-uniform 64-QAM. In addition to transmitted data, the OFDM symbol contains scattered pilot carriers, continual pilot carriers and TPS (transmission parameter signaling). There are 6048 useful carriers in 8K mode, 3024 in 4K mode, and 1512 in 2K mode.

At the transmitter, the modulated carriers in each OFDM symbol are zero padded to the next higher power of 2 and processed by an inverse fast Fourier transform (IFFT) to generate time domain symbols. Each time domain symbol is extended by a guard interval consisting of a cyclic continuation of the useful part of the symbol inserted before it.

In the receiver, the guard interval is removed and the time-domain symbols recovered are converted by a fast Fourier transform (FFT) to recover the frequency-domain symbol. Then the zero padded carriers are removed and the remaining carriers are processed to recover the useful data. This processing includes using the pilot carriers to estimate the transmission channel and removing its effects.

For reception of DVB-T/H signals that have been subjected to time-varying, multipath distortions, channel estimation requires a two-dimensional (2-D) interpolation, which is typically implemented as a one-dimensional (1-D) interpolation in the time domain followed by a 1-D interpolation in the frequency domain. Interpolation in the time domain is a causal process and requires storage of OFDM symbols, typically requiring a large memory.

Prior attempts to reduce these memory storage requirements revolve primarily around performing linear interpolation in the time domain without any extrapolation. See, e.g., Michael Speth et al., *Optimum receiver design for OFDM-based broadband transmission—Part II: A case study*, IEEE Trans. Communications, vol. COM-49, pp. 571-578 (April 2001). Other solutions have used joint two-dimensional interpolation, which is difficult to implement and still requires large amounts of memory storage. P. Hoeher et al., *Pilot-symbol-aided channel estimation in time and frequency*, Proc. Sixth Communication Theory Mini-Conf. Conjunction with IEEE GLOBECOM '97, Phoenix, Ariz., pp. 90-96. A collection of methods for performing the time domain interpolation (which do not focus on memory reduction) may be found in Sinem Coleri et al., *Channel Estimation Techniquest Based on Pilot Arrangement in OFDM Systems*, IEEE Transactions on Broadcasting, Vol 48, No. 3 (September 2002). All of the methods described by Coleri et al. deal with using the same amount of memory, but various ways of performing interpolation.

In severe fading environments, diversity processing is used to improve performance. Signals from multiple antenna ports are combined to obtain improved estimates of the modulated carriers. The lower the correlation between the transmission channels observed at the antenna ports, the more significant the improvement. The downside of conventional frequency-domain combining diversity processing is the duplication in the receive channel hardware. This is especially burdensome for DVB-T/H with its large number of carriers, which require therefore large memory buffers.

SUMMARY

In various embodiments, the present invention provides for time-sharing a single digital chain between two diversity signals, sharing a single frequency-domain sample buffer memory between diversity signals, and reducing the memory required for channel estimation.

According to one embodiment of the present invention, a frequency domain diversity DVB receiver device includes multiple antenna ports for receiving radio signals, and radio signal processing circuits connected to the antenna ports that convert the received radio signals into digital samples. The digital samples from the different antenna ports time-share a front-end processor which processes the digital samples to provide time-domain symbols. The time-domain symbols are stored in time-domain symbol buffers according to which of the antenna ports the time-domain symbols are received. A fast fourier transform circuit then retrieves the time-domain symbols and converts them frequency-domain symbols, which are then stored one or more frequency-domain symbol buffers according to the antenna ports the corresponding radio signals are received. A diversity processor which combines the frequency-domain symbols from the frequency-domain symbol buffers.

In one embodiment, the antenna ports are connected spatially separated antennas. Alternatively, the antenna ports are connected to orthogonal polarization feeds from a single antenna, or feeds from a single antenna providing different antenna patterns.

According to one embodiment of the present invention, the front-end processor implements cyclic delay diversity. The diversity processor may implement path selection, equal-gain combining or maximal ratio combining.

According to another embodiment of the present invention, the receiver may receive signals encoded for 8K, 4K and 2K carriers per OFDM symbol.

In one embodiment, the first antenna port and the second antenna port are connected to two spatially separated antennas. Alternatively, the first antenna port and the second antenna port may receive orthogonal polarization feeds from a single antenna or feeds from a single antenna providing different antenna patterns.

In one embodiment, the front-end processor implements cyclic delay diversity. The diversity processor may implement path selection, equal gain combining or maximal ratio combining.

The present invention is better understood upon consideration of the detailed description below and the accompanying drawings.

BRIEF DESCRIPTION OF THE DRAWINGS

The present invention is illustrated by way of example, and not limitation, in the figures of the accompanying drawings, in which.

To facilitate better understanding of the figures, like elements in the figures are assigned like reference numerals.

DETAILED DESCRIPTION

Described herein are methods and systems for time-sharing a single digital receive chain between two diversity signals and for reducing the memory storage requirements for OFDM channel estimation. Digital video broadcasting (DVB-T/H), frequency-domain combining, diversity receivers of the prior art implement two complete radio frequency (RF) and digital chains prior to diversity combining. According to one embodiment of the present invention, a single digital chain is time-shared between two diversity signals, thereby significantly reducing the required gate count and die area. Consequently, the chip cost of such a receiver implemented in an integrated circuit is also reduced. In some embodiments, the gate count may be further reduced by sharing a single frequency-domain sample buffer memory between the diversity signals in the 2K and 4K modes.

Figure 1:
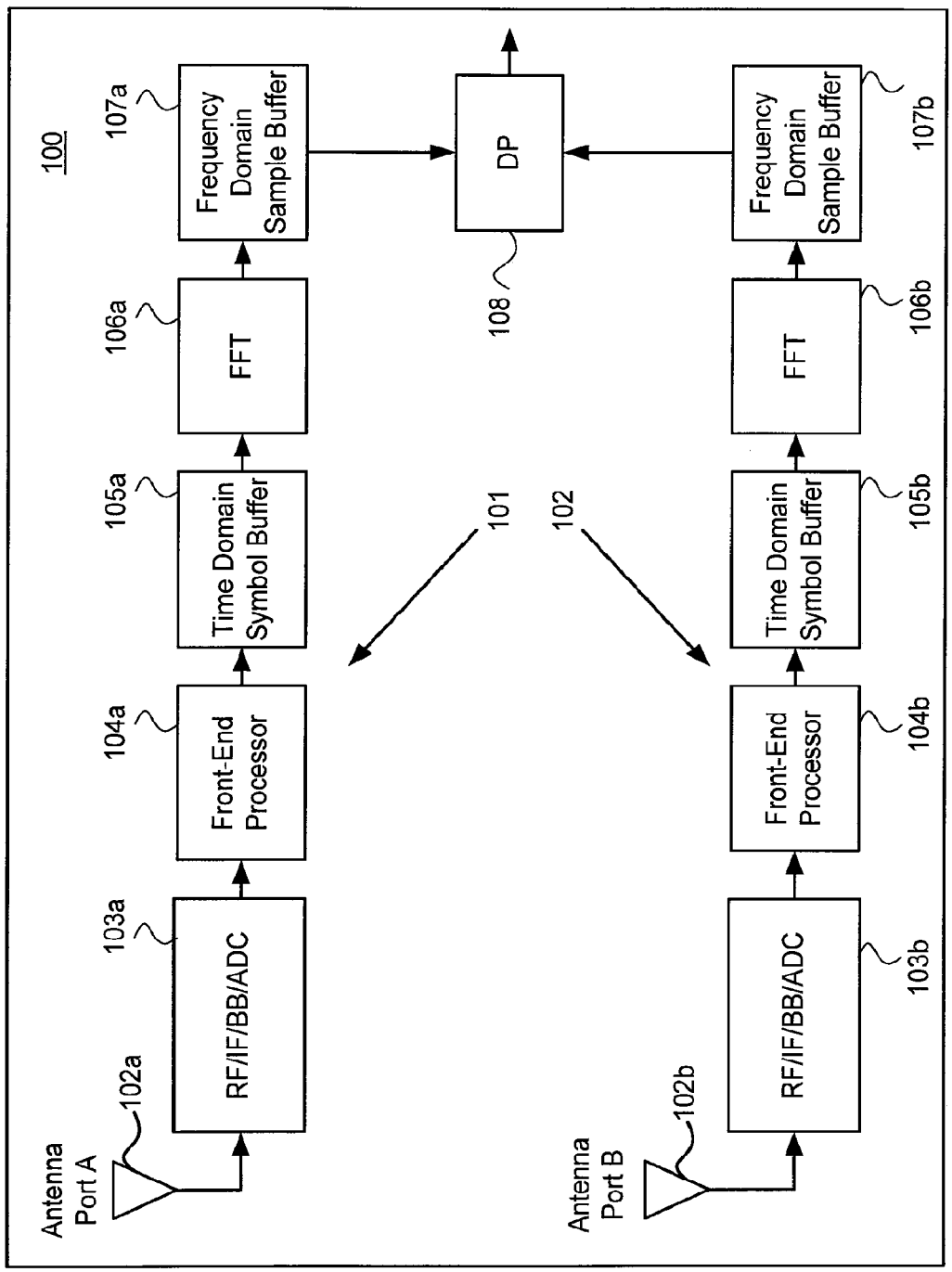
FIG. 1 illustrates a portion of conventional DVB-T/H, frequency-domain combining, diversity receiver 100.

Referring first to FIG. 1, conventional frequency-domain diversity receiver 100 using two complete RF and digital chains 101 and 102 is shown. Each of receive chains 101 and 102 includes its own antenna 102a or 102b, RF/IF stages, Baseband (BB) processing and analog-to-digital converter (ADC) circuitry 103a or 103b, front-end processor (FEP) 104a and 104b, time domain symbol buffer (TDSB) 105a or 105b, FFT block 106a or 106b and frequency domain sample buffer (FDSB) 107a or 107b.

Figure 2:
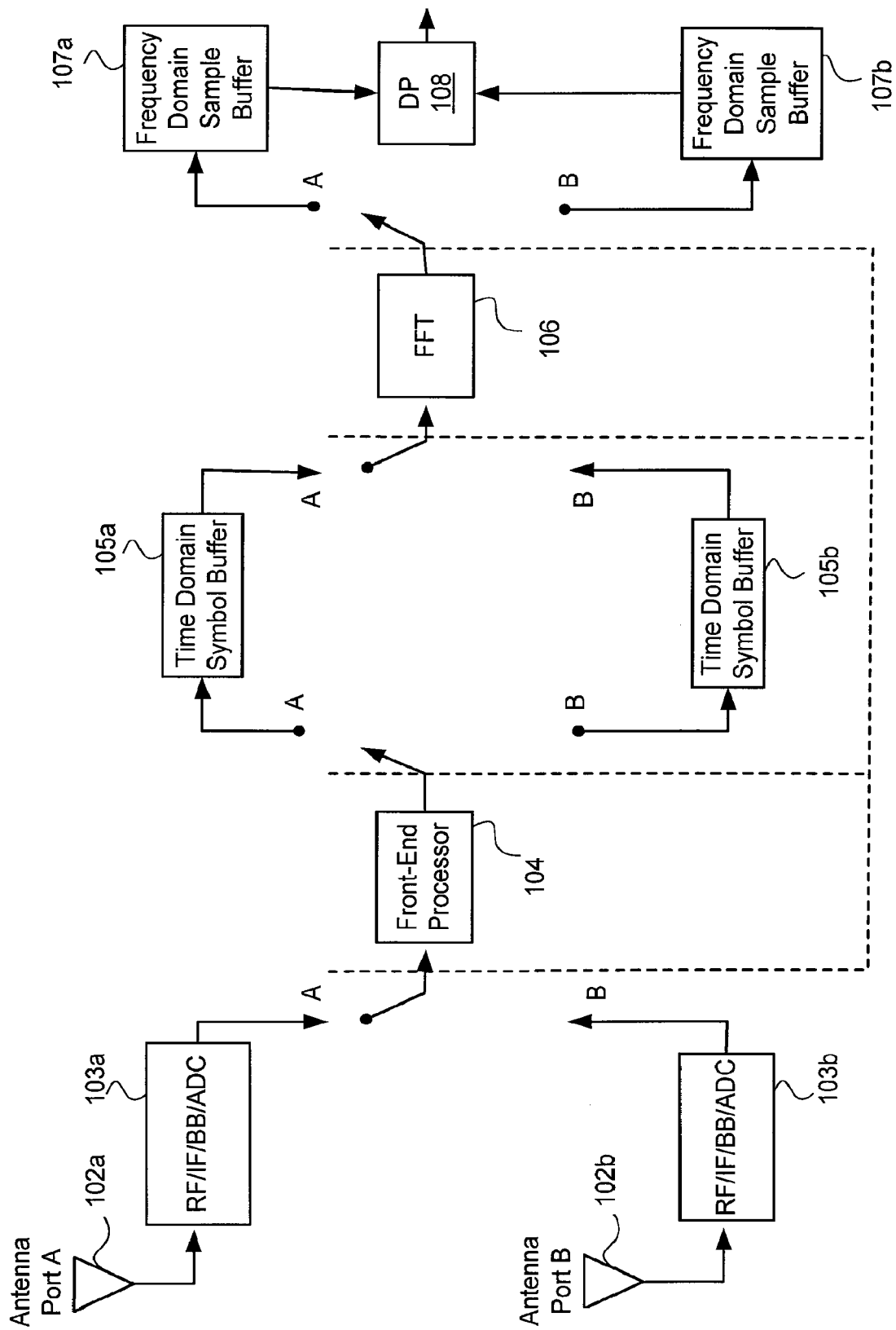
FIG. 2 illustrates a portion of a DVB-T/H, frequency-domain combining, diversity receiver 200, configured according to one embodiment of the present invention in which elements of the receive chain are time shared.
Figure 3:
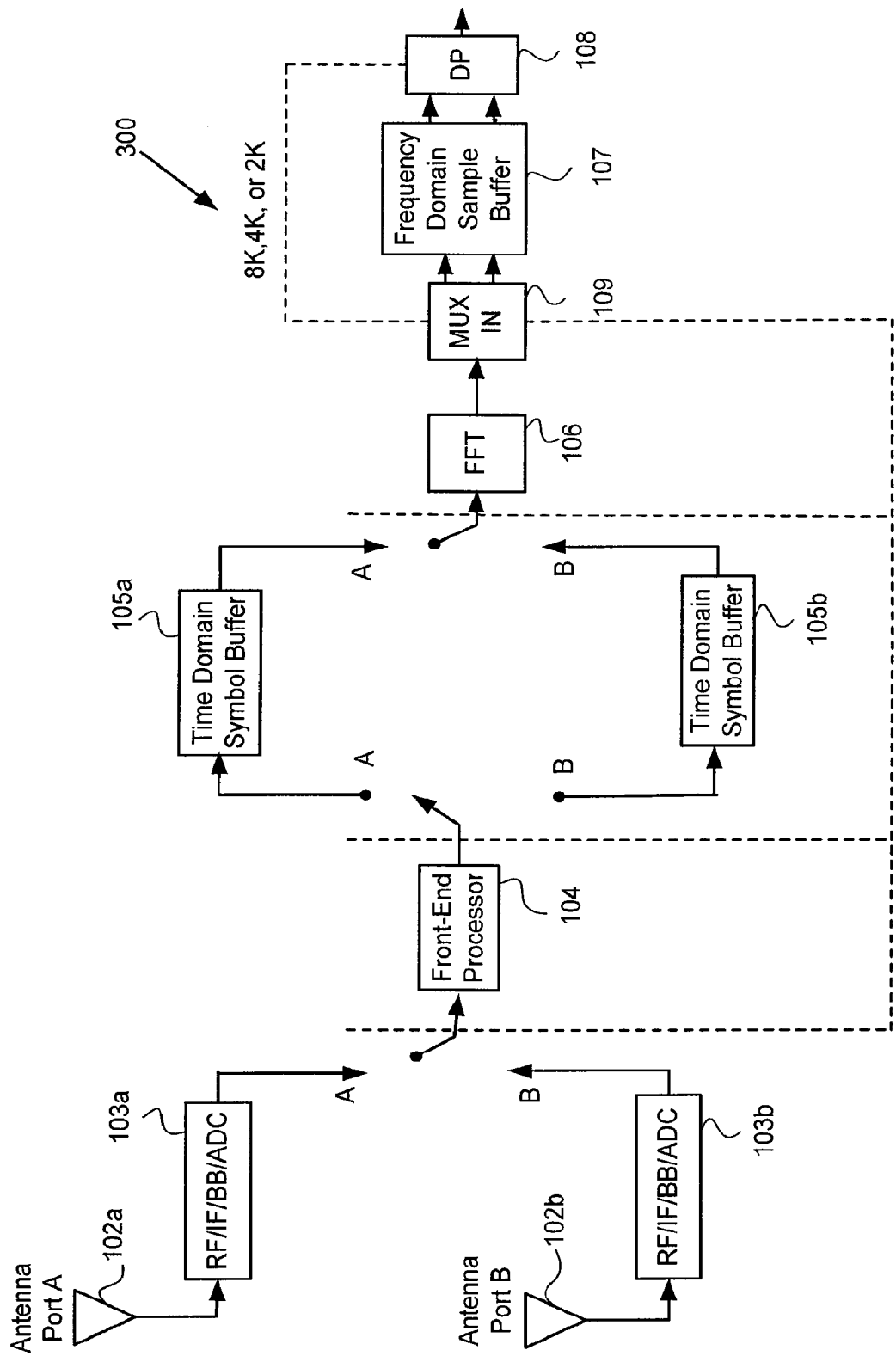
FIG. 3 illustrates a portion of DVB-T/H, frequency-domain combining, diversity receiver 300, configured according to a further embodiment of the present invention.
Figure 4:
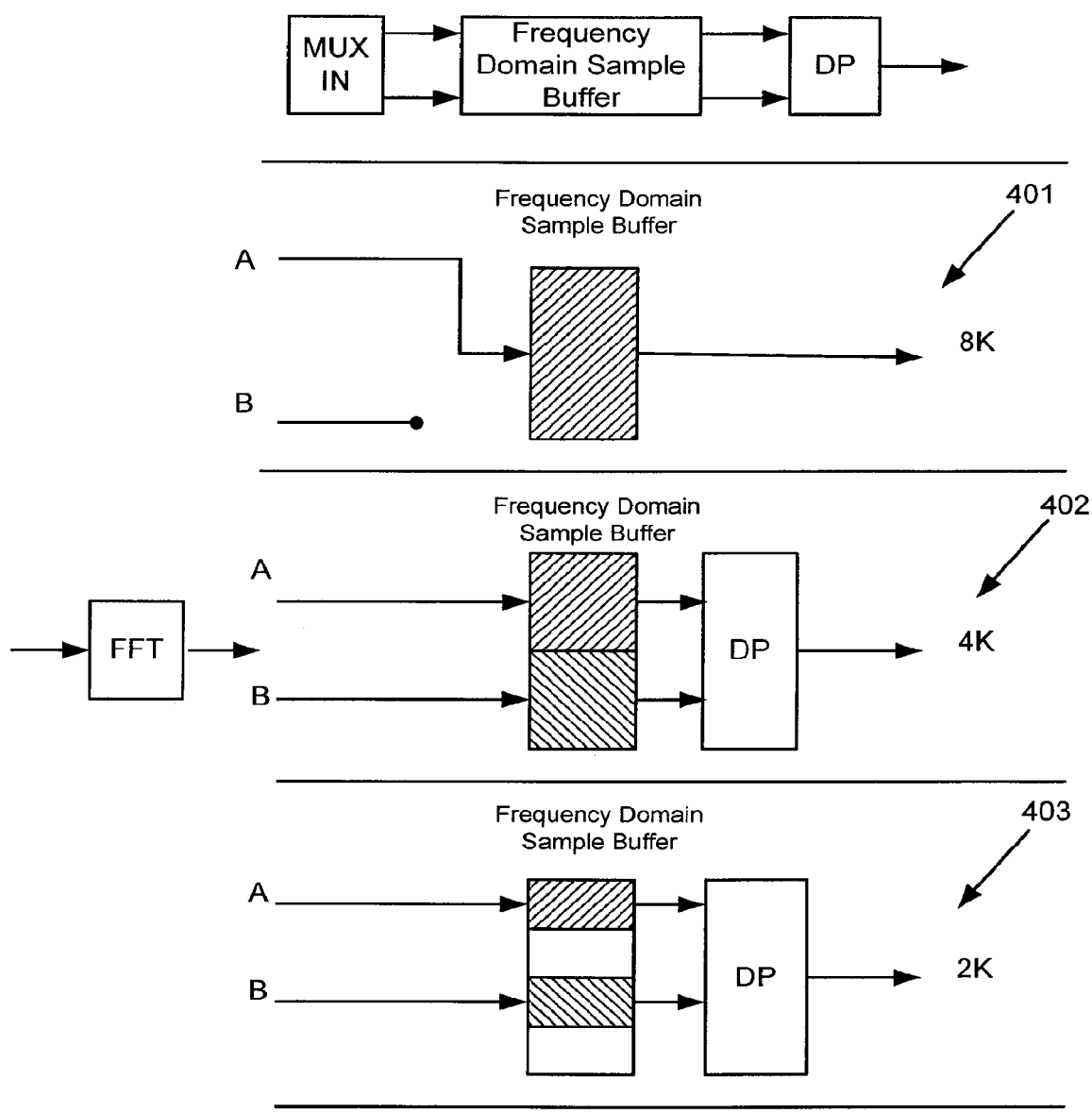
FIG. 4 illustrates in further detail sharing frequency-domain symbol buffer (FDSB) memory 107 in receiver 300 of FIG. 3.

In contrast, FIG. 2 shows, according to one embodiment of the present invention, a frequency-domain diversity receiver 200 in which digital chain 201 is time-shared between the two diversity signals. FIG. 3 shows, according to another embodiment of the present invention, frequency-domain diversity receiver 300 having the frequency-domain sample buffer (FDSB) memory 107 share the diversity signal in the 2K and 4K modes. FIG. 4 shows further details of sharing FDSB memory 107 among each of the 2K, 4K and 8K modes.

Although shown as though from two antennas 102a and 102b, in each of FIGS. 2-3, antenna ports at RF/IF/BB/ADC blocks 103a and 103b may be connected to two spatially separated antennae (spatial diversity), two orthogonal polarization feeds from the same antenna (polarization diversity), or two feeds from the same antenna providing different antenna patterns (pattern diversity).

RF/IF/BB/ADC blocks 103a and 103b each convert the RF signals from the antenna ports to digital signal samples. To perform this task, each RF signal is low-noise amplified to set the noise floor. Then the amplified signal is mixed with a carrier signal to translate it to zero, or very low, IF frequency. The in-phase (I) and quadrature-phase (Q) IF signals are low-pass filtered to reduce out-of-band interference, amplified, sampled, and quantized to form complex signal samples.

FEP (front-end processor) 104 filters the complex signal samples to mitigate aliasing and to decimate the resulting signals to an FFT sample rate. The FFT sample rates are 64/7 MHz for 8 MHz channels, 8 MHz for 7 MHz channels, 48/7 MHz for 6 MHz channels, and 40/7 MHz for 5 MHz channels. FEP 104 also compensates IQ imbalances, frequency offsets, and other effects.

FEP 104 may also implement cyclic delay diversity (CDD), which is a form of time-domain diversity that sums two or more cyclic-delays of the samples from TDSB 105. The resulting combination of time-domain and frequency-domain diversities provides increased diversity order, and hence better performance. Implementation of CCD are described in K. Witrisal, Y.-H. Kim, R. Prasad, and L. P. Ligthart, "Antenna Diversity for OFDM using Cyclic Delays", Delft University of Technology, September 2001; and in Muhammad Imadur Rahman, Klaus Witrisal, Suvra Sekhar Das, Frank H. P. Fitzek, Ole Olsen, Ramjee Prasad, "Optimum Pre-DFT Combining with Cyclic Delay Diversity for OFDM Based WLAN Systems", IEEE Vehicular Technology Conference (VTC) 2004 Spring.

TDSBs (time domain symbol buffer) 105a and 105b hold the time-domain signal samples. There are 2048, 4096 and 8192 complex samples in the 2K, 4K and 8K modes, respectively. To accommodate the 8K mode with 16 bits (2 bytes) per real or imaginary part of a complex sample, TDSBs 105a and 105b hold 4×8192=32758 bytes.

FFT block 106 converts the time-domain signal samples to the frequency domain. In the implementations shown in FIGS. 2 and 3, FEP 104 and FFT block 106 are time-shared between the A and B paths, resulting in a significantly reduced gate count, as compared to the conventional implementation shown in FIG. 1.

Frequency-domain sample buffers (FDSBs) 107a and 107b (FDSB 107 in FIG. 3) hold the frequency-domain (carrier) samples. There are 6817, 3409 and 1705 carriers in 8K, 4K and 2K modes, respectively. Each carrier value is represented by a complex number. Therefore, to accommodate the 8K mode, with 16 bits (2 bytes) per real or imaginary part of a complex sample, FDSB 107a and 107b of receivers 100 and 200 of FIGS. 1 and 2 each hold 4×6817=27268 bytes, for the 8K mode.

To accommodate the 4K mode operations in both the A and B paths, combined FDSB 107 of FIG. 3 hold of 2×4×3409 (4K mode)=27272 bytes, which is 4 bytes more than each of FDSB 107a and 107b of FIGS. 1 and 2. Thus, FDSB 107 of FIG. 3 is approximately half the total sizes of FDSB 108a and 108b in each of receivers 100 and 200 in FIGS. 1 and 2.

As shown in FIG. 4, receiver 300 of FIG. 3 does not support frequency-domain diversity in the 8K mode. In that mode, output values from FFT block 106 for one of the antennae is stored in FDSB 108 and output to diversity processor (DP) 108, while the output samples from FFT block 106 corresponding to the other antenna are discarded. In the 2K and 4K modes, the FFT block 106 processes signal samples from both antenna ports A and B and provide them in FDSB 107, which are then processed by diversity processor DP 108.

DP 108 combines the frequency-domain symbols (on a carrier-by-carrier basis) from the two paths to form an output symbol. DP 108 operates in one of three modes: path selection, equal gain combining, or optimal gain combining.

Under the path selection mode, a decision is made on a carrier-by-carrier basis to either output a carrier from the A path or from the B path, based on signal power or on a signal-to-noise ratio (SNR).

Under the equal gain combining mode, the symbols from the A path and the B path are weighted by the same value (e.g., 0.707 or $1/\sqrt{2}$) and summed to form the output symbol, on a carrier-by-carrier basis.

Under the optimal gain combining mode, an output symbol is formed by the weighted carrier-by-carrier weighted sum of the symbols in the A and B paths, where the symbol of each path is weighted by a different calculated value. The calculated value of each carrier is independently calculated. One technique for calculating the weights is the maximal ratio combining (MRC) technique, which calculates the weights to maximize output SNR. Additional detail regarding such a technique may be found, for example, in Section 8.2 of Gregory D. Durgin, "Space-Time Wireless Channels", published by Prentice Hall (2003), which is incorporated herein by reference.

As indicated above, prior channel estimation techniques requires storing at least four OFDM symbols before demodulation, thus requiring a sizeable memory. According to the present invention, the memory requirement is reduced using a judicious mixture of "selective" interpolation and extrapolation in the time domain, and interpolation using non-uniform samples in the frequency domain.

A receiver of the present invention may operate in any of several modes. In one mode a large Doppler spread is supported, but is accompanied by a shorter maximum delay spread ($T_u/8$, rather than $T_u/4$). In a second mode, a large delay spread ($T_u/4$) is supported, but is accompanied by a smaller Doppler spread.

In this detailed description, the algorithms discussed carry out steps that may involve calculating, comparing, displaying or otherwise manipulating values representing physical quantities, such as electrical signals, in memory, a storage device or a display device of a computer system or another electronic computing device.

One method for providing a channel estimate performs a 2-dimensional (2-D) interpolation using channel estimates at one or more pilot frequencies. 2-D interpolation is implemented as two one-demensional (1-D) interpolations (e.g., interpolations in both the time-domain and the frequency domain).

Figure 5:
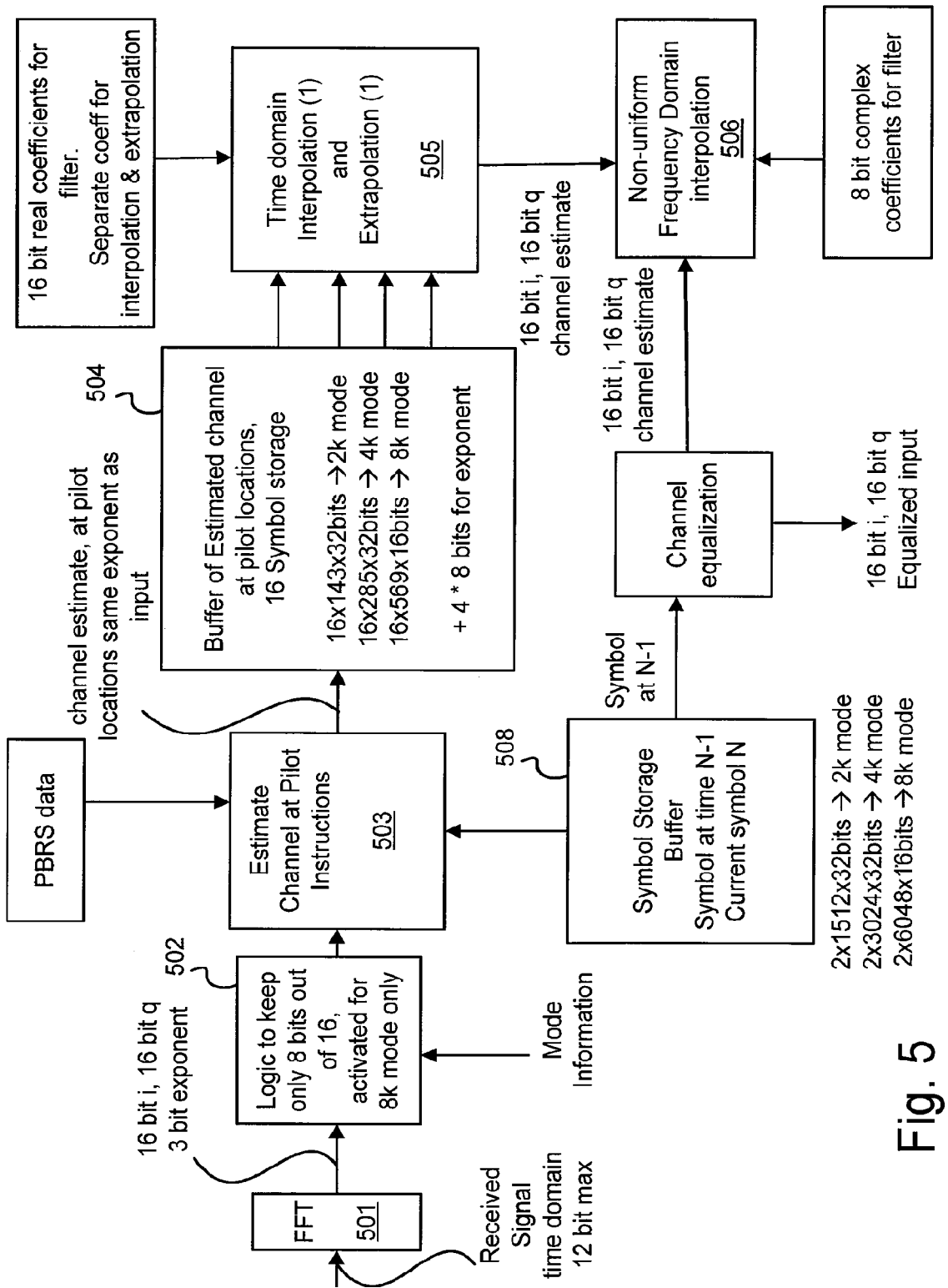
FIG. 5 illustrates a channel estimation process in accordance with one embodiment of the present invention.

Referring to FIG. 5, a first operational mode is next described. At step 501, the method uses a fast Fourier Transform (FFT) to convert the received time-domain signal to a frequency-domain representation.

At step 502, if operating under an 8K mode, the method reduces the memory requirement by storing only the higher-order 8 bits for each of both I and Q frequency-domain symbols (i.e., the in-phase and quadrature-phase samples, respectively).

At step 503, the method provides a channel estimate based on selected pilot carrier frequencies. For example, the method first removes the random data generated by the pseudo-noise binary random sequence (PBRS) at the transmitter (step 503a) and obtains the magnitude of the received pilot value*3/4 (step 503b), in systems where the random data has real values of +4/3 or −4/3, resulting from the boosted power at these pilot frequencies.

At step 504, the channel estimates at the pilot carrier frequencies are stored in a buffer memory. At step 505, a time-domain interpolation is performed on the channel estimates. Due to the pattern of the scattered pilot carrier frequencies—which is repeated every four OFDM symbol times—a 1-D time-domain interpolation is first performed, followed by a 1-D frequency-domain interpolation at 506. The present invention handles changes to time domain interpolation and frequency domain interpolation. The channel estimates are then used to equalize at step 507 the current received OFDM symbol, which is stored into a symbol storage buffer at step 508.

One suitable time-domain interpolation uses a one-symbol look-ahead with a conventional Wiener 4-tap time interpolator. (For an overview of a Weiner interpolator, see, e.g., R. van Nee and R. Prasad, *OFDM Wireless Multimedia Communications* ("van Nee & Prasad"), Artech House (2000)) provides a basic overview of Wiener interpolators.) In this case the time-correlation function is the Jakes spectrum; however, other spectrums are also suitable.

Using four preceding pilot symbols, the method extrapolates one future pilot symbol from every four pilot symbols in the time domain. The extrapolated pilot symbol is exactly one OFDM symbol ahead from the current pilot symbol. The scattered structure of the pilot carrier frequencies implies that a pilot carrier needs to be extrapolated is 9 (or −3) bins away from a current pilot carrier, as illustrated below in FIG. 6. Each channel bin represents a carrier frequency.

Figure 6:
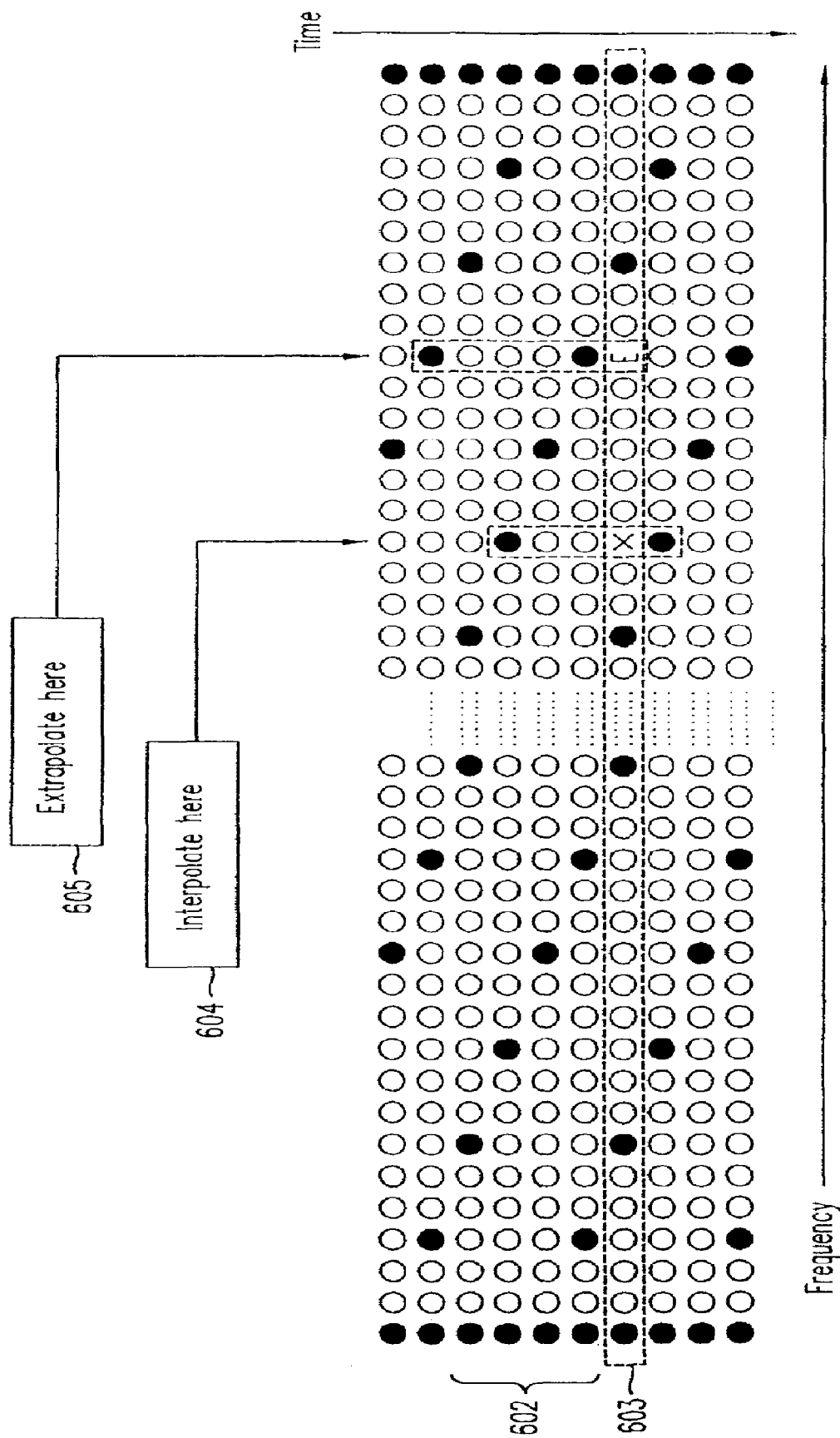
FIG. 6 illustrates a process for time-domain interpolation and extrapolation, in accordance with one embodiment of the present invention.

FIG. 6 illustrates graphically the carrier frequencies at which interpolation and extrapolation occurs. In FIG. 6, each row represents an OFDM symbol interval. Thus, reference numerals 602 represents four OFDM symbol intervals prior in time to current OFDM symbol interval 603. Within each row, each filled circle '●' indicates a channel bin in which a pilot symbol is transmitted during the OFDM symbol interval, and each open circle indicates a channel bin for which a channel estimate is to be provided. Note that, in the current OFDM symbol interval 603, except at the edges, pilot symbols are provided every 12 channel bins. Channel estimates based only on measurements at pilot symbols in the current OFDM symbol interval 603 may not be reliable because of the distance between pilot channels. As shown in FIG. 6, at channel bin 604 of the current OFDM symbol interval 603, the last pilot symbol was provided three OFDM symbol intervals ago, and another pilot symbol is provided in the next OFDM symbol interval. A channel estimate for frequency 604 (indicated by the 'x' mark) is obtained by interpolating using the last pilot symbol and the next pilot symbol.

At channel bin 605 of the current OFDM symbol interval 603, the last two pilot symbols for that frequency were provided in the last OFDM symbol interval and four OFDM symbol intervals ago. In between these known pilot symbols, previous interpolation operations also yielded interpolated pilot symbols. Thus, the current pilot symbol (indicated by the mark 'e') at channel bin 605 is extrapolated using the measured and interpolated pilot symbols of the four previous OFDM symbols. A Wiener filter may be used for extrapolation, such as taught in van Nee & Prasad.

Figure 7:
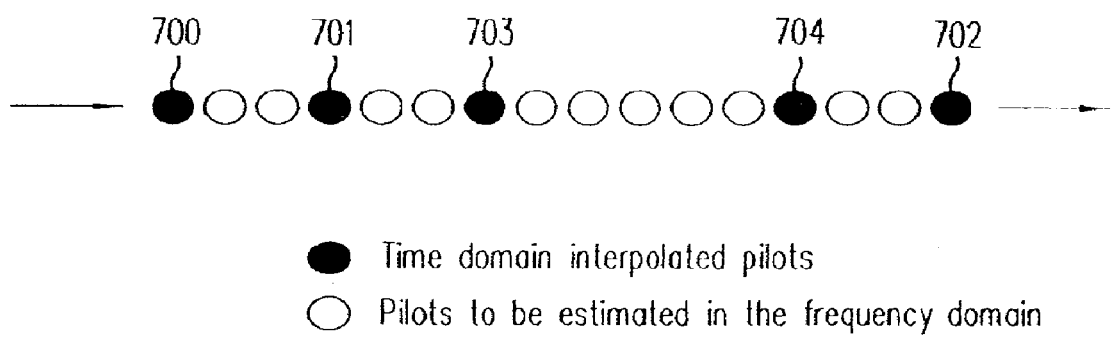
FIG. 7 illustrates the non-uniform spacing of the pilot symbols in a frequency-domain interpolation.

FIG. 7 shows an enlarged view of a portion of current OFDM symbol 603. Channel bins 701 and 702 are provided pilot symbols. Channel bin 703 is provided a time-domain interpolated pilot symbol, according to the one symbol-lookahead interpolation described above. Channel bin 704 is provided the extrapolated pilot symbol. The carrier frequencies where measured, time-domain interpolated or extrapolated pilot symbols are shown by the filled circles '●'. Neglecting edge pilots, three channel estimates may be provided from time-domain operations for every 12 channel bins. The maximum separation between any two channel bins to be estimated from the current OFDM symbol interval is therefore 6. This implies that a delay spread of $T_u/8$ should be handled comfortably. The open circles in FIG. 7 represent channel bins in which channel estimates are to be provided by frequency-domain interpolations. Returning to FIG. 5, the method performs a non-uniform interpolation in the frequency domain at step 506. As shown in FIG. 7, because of the preceding time-domain interpolations, the frequency-domain interpolation does not have uniformly spaced scattered pilots (hence, "non-uniform" interpolation). A 12-tap Wiener filter may be designed with the knowledge of this non-uniform sampling. The pilots on the edges require large number of filter coefficients to be stored. Hence, in one embodiment of the present invention, the edge pilots are interpolated using a linear interpolation.

Similar to that taught in van Nee & Prasad, the available pilot values are arranged in a vector P and the channel values that are to be estimated from P are in a vector H. H may be obtained from P using:

$$H = R_{hp} * R_{pp}^{-1} P$$

Where $R_{hp}$ is the cross-covariance matrix between H and noisy pilot estimates P, and $R_{pp}$ is the auto-covariance matrix. Thus, the interpolation matrix depends only on the position of the pilots and channel estimates. Therefore, the interpolation coefficients can be designed based on prior knowledge of the 'positions of the known pilots.' One difference between conventional interpolation and interpolation for this set of non-uniform pilots is the 'position of the known pilots.'

The above-described embodiment of the present invention interpolates at one pilot location and extrapolates at one pilot location. Alternatively, extrapolation may be performed at all three pilot locations, or at any two pilot locations. Moreover, different filter lengths may be employed. For example, the above-described embodiments use a 4-tap filter for interpolation in the time domain and a 12-tap filter for interpolation in the frequency domain. Alternative embodiments may use different filter lengths.

Thus, methods and systems for memory efficient OFDM frequency domain diversity processing and channel estimation have been described.

The above detailed description is provided to illustrate the specific embodiments of the present invention and is not intended to be limiting. Numerous modifications and variations within the present invention are possible. The present invention is set forth in the following claims.

What is claimed is:

1. A frequency domain diversity DVB receiver device comprising:
   a. a first antenna port and a second antenna port for receiving radio signals;
   b. a radio signal processing circuit connected to said first antenna port, and a second radio frequency signal processing circuit connected to said second antenna port, each radio signal processing circuit converting the radio signals to digital samples;
   c. a first switch which alternately selects the digital samples of the first and the second radio signal processing circuits;
   d. a front-end processor which processes the digital samples selected by said first switch to provide time-domain symbols;
   e. a second switch synchronized with said first switch and connected to receive the output time-domain symbols of said front-end processor;
   f. a first time-domain symbol buffer and a second time-domain symbol buffer receiving from said second switch to receive time-domain symbols corresponding to digital samples received from the first and second radio signal processing circuits, respectively;
   g. a third switch which alternately receives time-domain symbols from said first and second time-domain symbol buffers;
   h. a fast fourier transform circuit receiving the time-domain symbols from the said third switch and converting the time-domain symbols into frequency domain symbols;
   i. a fourth switch synchronized with said third switch to receive the frequency domain symbols from the fast-fourier transform circuit;
   j. a first frequency domain symbol buffer and a second frequency domain symbol buffer connected to said fourth switch to receive frequency domain symbols corresponding to time-domain symbols output from the first and second time-domain symbol buffers, respectively; and
   k. a diversity processor which combines the frequency domain symbols from said first and second frequency-domain symbol buffers.

2. The device of claim 1, wherein said first antenna port and said second antenna port are connected to two spatially separated antennas.

3. The device of claim 1, wherein said first antenna port and said second antenna port are connected to two orthogonal polarization feeds from a single antenna.

4. The device of claim 1, wherein said first antenna port and said second antenna port are connected to two feeds from a single antenna providing different antenna patterns.

5. The device of claim 1, wherein said front-end processor implements cyclic delay diversity.

6. The device of claim 1, wherein said diversity processor implements path selection.

7. The device of claim 1, wherein said diversity processor implements equal-gain combining.

8. The device of claim 1, wherein said diversity processor implements maximal ratio combining.

9. A frequency domain diversity DVB receiver device comprising:
   a. a first antenna port and a second antenna port for receiving radio signals;
   b. a radio signal processing circuit connected to said first antenna port, and a second radio frequency signal processing circuit connected to said second antenna port, each radio signal processing circuit converting the radio signals to digital samples;
   c. a first switch which alternately selects the digital samples of the first and the second radio signal processing circuits;
   d. a front-end processor which processes the digital samples selected by said first switch to provide time-domain symbols;
   e. a second switch synchronized with said first switch and connected to receive the output time-domain symbols of said front-end processor;
   f. a first time-domain symbol buffer and a second time-domain symbol buffer receiving from said second switch to receive time-domain symbols corresponding to digital samples received from the first and second radio signal processing circuits, respectively;
   g. a third switch which alternately receives time-domain symbols from said first and second time-domain symbol buffers;
   h. a fast fourier transform circuit receiving the time-domain symbols from the said third switch and converting the time-domain symbols into frequency-domain symbols;
   i. a multiplexer synchronized with said third switch connected to receive the frequency-domain symbols from said fast-fourier transform processor;
   j. a frequency-domain symbol buffer connected to said multiplexer operating in one of a plurality of modes, each mode corresponding to a number of carrier included in each frequency-domain symbol used in that mode of operation; and
   k. a diversity processor which processes the frequency-domain symbols of said frequency-domain symbol buffer.

10. The device of claim 9, wherein the modes of operation comprise an 8K mode, a 4K mode and a 2K mode.

11. The device of claim 10 wherein, under the 8K mode, the frequency-domain symbol buffer stores only frequency-domain symbols corresponding to time-domain symbols from a selected one of the first and second time-domain symbol buffers.

12. The device of claim 9, wherein the diversity processor sums frequency-domain symbols corresponding to time-domain symbols from both the first and second time-domain symbol buffers.

13. The device of claim 9, wherein the diversity processor selects only frequency-domain symbols corresponding to time-domain symbols from a selected one of the first and second time-domain symbol buffers.

14. The device of claim 9, wherein said first antenna port and said second antenna port are connected to two spatially separated antennas.

15. The device of claim 9, wherein said first antenna port and said second antenna port are connected to two orthogonal polarization feeds from a single antenna.

16. The device of claim 9, wherein said first antenna port and said second antenna port are connected to two feeds from a single antenna providing different antenna patterns.

17. The device of claim 9, wherein said front-end processor implements cyclic delay diversity.

18. The device of claim 9, wherein said diversity processor implements path selection.

19. The device of claim 9, wherein said diversity processor implements equal gain combining.

20. The device of claim 9, wherein said diversity processor implements maximal ratio combining.

* * * * *